(12) United States Patent
Di Martino et al.

(10) Patent No.: US 9,403,724 B2
(45) Date of Patent: Aug. 2, 2016

(54) CERAMIC MATERIAL FOR RADOME, RADOME AND PROCESS FOR THE PRODUCTION THEREOF

(75) Inventors: Daniela Di Martino, Rome (IT); Seiti Diletta, Ravenna (IT); Laura Esposito, Ravenna (IT)

(73) Assignee: MBDA ITALIA S.p.A., Rome (IT)

( * ) Notice: Subject to any disclaimer, the term of this patent is extended or adjusted under 35 U.S.C. 154(b) by 32 days.

(21) Appl. No.: 14/380,549

(22) PCT Filed: Feb. 22, 2012

(86) PCT No.: PCT/IT2012/000052
§ 371 (c)(1),
(2), (4) Date: Dec. 15, 2014

(87) PCT Pub. No.: WO2013/124871
PCT Pub. Date: Aug. 29, 2013

(65) Prior Publication Data
US 2015/0099619 A1    Apr. 9, 2015

(51) Int. Cl.
| | | |
|---|---|---|
| *C04B 35/587* | (2006.01) | |
| *C04B 35/596* | (2006.01) | |
| *C04B 35/584* | (2006.01) | |
| *C04B 35/638* | (2006.01) | |
| *C04B 35/645* | (2006.01) | |
| *H01Q 1/42* | (2006.01) | |

(Continued)

(52) U.S. Cl.
CPC ............. *C04B 35/584* (2013.01); *C04B 35/638* (2013.01); *C04B 35/64* (2013.01); *C04B 35/645* (2013.01); *C04B 41/0072* (2013.01); *H01Q 1/42* (2013.01); *C04B 2235/3206* (2013.01); *C04B 2235/3217* (2013.01); *C04B 2235/3418* (2013.01); *C04B 2235/604* (2013.01); *C04B 2235/612* (2013.01); *C04B 2235/767* (2013.01); *C04B 2235/77* (2013.01); *C04B 2235/80* (2013.01); *C04B 2235/94* (2013.01); *C04B 2235/9653* (2013.01); *H01Q 1/28* (2013.01)

(58) Field of Classification Search
CPC .. C04B 35/584; C04B 35/587; C04B 35/591; C04B 35/593; C04B 35/5935
See application file for complete search history.

(56) References Cited

U.S. PATENT DOCUMENTS

| | | | |
|---|---|---|---|
| 4,542,109 A | 9/1985 | Pasto | |
| 4,642,299 A * | 2/1987 | Hsieh | C04B 35/584 343/872 |

(Continued)

FOREIGN PATENT DOCUMENTS

| | | |
|---|---|---|
| WO | WO8500803 | 2/1985 |
| WO | WO9201652 | 2/1992 |

OTHER PUBLICATIONS

Japanese Office Action for application 2014558272; Jan. 2016; Japanese Patent Office 4 pages plus translation of 1 page.

(Continued)

*Primary Examiner* — Karl Group
(74) *Attorney, Agent, or Firm* — Thomas Horstemeyer, LLP

(57) ABSTRACT

A ceramic material for radome is illustrated comprising: —about 80-95% (% wt) of $Si_3N_4$; about 5-15% (wt %) of magnesium aluminosilicates including 2.5-12.5% (wt %) of $SiO_2$, 0.5-3% (wt %) of MgO and 2-6% (wt %) of Al2O3; and having a density not lower than 2.5 g/cm$^3$ and a dielectric constant not exceeding 6.5. A process for producing a radome is also illustrated.

5 Claims, 2 Drawing Sheets

Figure 1:
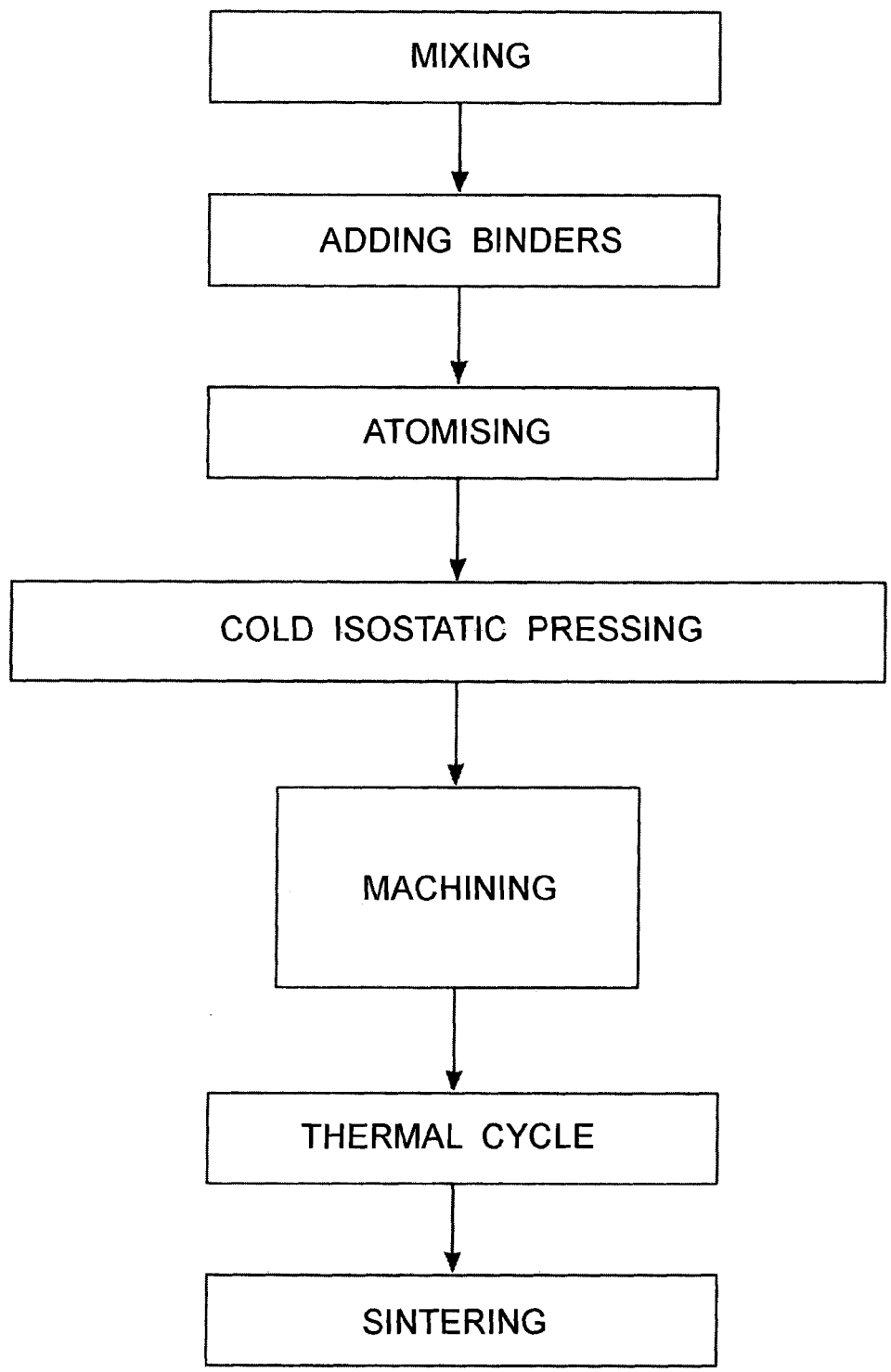

(51) Int. Cl.
*C04B 35/64* (2006.01)
*C04B 41/00* (2006.01)
*H01Q 1/28* (2006.01)

(56) References Cited

U.S. PATENT DOCUMENTS 4,654,315 A * 3/1987 Hsieh .................... C04B 35/584
 501/152
5,023,215 A * 6/1991 Cleveland ............. C04B 41/009
 106/14.05
5,034,356 A * 7/1991 Brun ..................... C04B 35/806
 156/89.27
5,376,602 A * 12/1994 Nilsen .................. C04B 35/584
 264/676
6,091,375 A 7/2000 Goto et al.

OTHER PUBLICATIONS

Russian Office Action for application 2014138117; Dec. 24, 2015; 5 pages plus one translation page, Moscow, Russia.

* cited by examiner

CERAMIC MATERIAL FOR RADOME, RADOME AND PROCESS FOR THE PRODUCTION THEREOF

CROSS-REFERENCE TO RELATED APPLICATION

This application is the 35 U.S.C. §371 national stage of PCT Application No. PCT/IT2012/000052, filed Feb. 22, 2012, which is herein incorporated by reference in its entirety.

The present invention relates to a ceramic material for radome, a radome and a process for the production thereof.

In particular, the present invention relates to a ceramic material for radome for missile and generally for aerospace applications and the relevant production process.

The materials to be used for such applications need particularly strict requirements in terms of high mechanical resistance, high heat resistance and good dielectric properties.

In particular, the materials used in radome applications must ensure an optimum mechanical resistance and a low dielectric constant in a wide temperature range.

They must be capable of resisting against aerodynamic forces, atmospheric agents and thermal shocks over a long period of time and, at the same time, they must be transparent with respect to electromagnetic waves.

Use of ceramic material for making radomes is known.

In particular, the use of ceramic materials based on $Si_3N_4$ (silicon nitride) for making radome, due to their good mechanical properties both at ambient temperature and at high temperatures and due to their good resistance against thermal shocks, is known.

However, such materials have problems during the sintering step in that silicon nitride, at atmospheric pressure, tends to break down without first melting or sintering.

For this reason, the step of forming articles made of such materials is carried out by pressing. This represents a limit in that the forming by means of pressing allows obtaining solely simple shapes. Therefore producing articles having more complex shapes requires performing subsequent machining operations on the piece.

These operations are long, complex and expensive even due to the good mechanical characteristics of the material. In particular, the high hardness of such materials requires complex mechanical machining, operations and use of expensive tools.

A material comprising silicon nitride and barium aluminosilicate (BAS) was proposed in some solutions of the prior art.

Such known solutions, though having high density and thus good mechanical properties, have a high dielectric constant and thus poor dielectric properties.

Furthermore, the process of producing radomes comprising such materials presents the aforementioned disadvantages.

Furthermore, it should be observed that most of the known ceramic materials based on silicon nitride studied for aerospace applications present industrial application problems, in that the properties thereof are strictly related both to the microstructure and macrostructure thereof hence even slight variations in the composition thereof and/or in the production process, considerably modify the properties thereof.

Thus, the object of the present invention is to provide a ceramic material for radome that has high performance in terms of mechanical resistance, heat resistance and dielectric properties in a wide temperature range.

A further object of the present invention is to provide a ceramic material for radome and a process for producing radomes free from sintering problems.

A further object of the present invention is to provide a process for producing a radome that is simple, inexpensive and that allows obtaining a radome having the aforementioned mechanical, heat and dielectric properties.

These and other objects are attained by means of a ceramic material for radome comprising:
about 80-95% (% wt) of $Si_3N_4$; and
about 5-15% (wt %) of magnesium aluminosilicates including 2.5-12.5% (wt %) of $SiO_2$, 0.5-3% (wt %) of MgO and 2-6% (wt %) of $Al_2O_3$;
and having a density not lower than 2.5 g/cm³ and a dielectric constant not exceeding 6.5.

Preferably the values of the dielectric constant are substantially constant or are subjected to slight variations upon the variation of the temperature.

The values of the dielectric constant are measured in the X, Ku and Ka bands.

According to preferred embodiments, said density is comprised between 2.5 and 2.9 g/cm³ and/or said dielectric constant is comprised between 5.7 and 6.4.

According to particularly preferred embodiments, said density is comprised between 2.65 and 2.79 g/cm³ and/or said dielectric constant is comprised between 5.9 and 6.2.

Advantageously, 15-35% (wt %) of $Si_3N_4$ is $\beta$-$Si_3N_4$. This allows improving the dielectric properties of the material.

Preferably the material comprises 90-94% (wt %) of $Si_3N_4$; and about 6-10% (wt %) of magnesium aluminosilicates including 3.2-5.2% (wt %) of $SiO_2$, 0.7-2% (wt %) of MgO and 2.1-4% (wt %) of $Al_2O_3$.

A particularly preferred composition of the material according to the present invention comprises 90% (wt %) of $Si_3N_4$, 5.1% (wt %) of $SiO_2$, 1.4% (wt %) of MgO and 3.5% (wt %) of $Al_2O_3$.

According to a second aspect thereof, the invention relates to a radome comprising such material, which attains the same advantages as the material, i.e. a good mechanical and heat resistance as well as good dielectric properties for a wide temperature range.

More generally, the invention regards an article comprising such material.

According to a third aspect thereof, the invention relates to a process for producing a radome comprising the following steps:
a. forming a homogeneous mixture of about 80-95% (% wt) of $Si_3N_4$ powder and about 5-15% (wt %) of magnesium aluminosilicates powder including 2.5-12.5% (wt %) of $SiO_2$, 0.5-3% (wt %) of MgO and 2-6% (wt %) of $Al_2O_3$;
b. adding at least one organic binder to the mixture;
c. atomising the mixture;
d. subjecting the mixture to isostatic pressing at ambient temperature in a special mould so as to form a green semi-finished product;
e. mechanically machining the green semi-finished product so as to substantially confer it the final shape;
f. subjecting the shaped green semi-finished product to a thermal cycle;
g. sintering the green semi-finished product so as to obtain the finished product.

Such process is advantageous with respect to the known processes since it allows obtaining a radome with high mechanical and heat resistance as well as good dielectric properties in a wide temperature range.

In particular, the entirety of the specific steps of such process allow obtaining a specific microstructure which confers the material, and thus to radome, the aforementioned features.

Furthermore, the fact of providing a mechanical machining on a green semi-finished product, allows obtaining an improved machinability, recovering of materials, greater rapidity of the production process and improved mechanical characteristics of the finished product.

Were finishing operations are required on the sintered piece, these operations would be shorter with respect to those of the prior art hence saving in terms of time and life of the tools.

Furthermore, the entirety of the operating steps and the specific composition of the material, allow overcoming the problem related to industrial applicability in that they were optimized for industrial production and not only for prototypes.

Preferably, the step a of forming a homogeneous mixture comprises the following two sub-steps:

a'. mixing $Si_3N_4$ with $SiO_2$ so as to form a pre-mixture;
a". mixing the pre-mixture with MgO and with $Al_2O_3$.

Preferably, the step a provides for a step of adding water to the mixture so as to form a slurry.

Advantageously, the step d of isostatic pressing is carried out at a pressure comprised between 1500 and 1800 bars.

According to preferred embodiments of the process of the invention, the step f of subjecting the semi-finished product to a thermal cycle comprises the following sub-steps:

f'. raising the temperature of 8° C./hr up to reaching a temperature of 300° C.-390° C.;
f". leaving the semi-finished product at temperature for 3-6 hours.

Preferably, the step f of subjecting the semi-finished product to a thermal cycle is carried out in a furnace which provides a specific support or base and/or a system for conveying gases such to ensure the organic binder to exit from the piece. This allows preventing the breakage of the semi-finished product due to the pressure exerted by the organic binder.

Preferably, the step g of sintering is carried out at a temperature of 1500° C.-1650° C. and/or with liquid phase in inert atmosphere, preferably in nitrogen.

The fact that such temperature is low allows reducing the investment and running costs of the plant and thus of the production process.

Advantageously, the step g of sintering is carried out on a base made of the same material as the semi-finished product. This allows avoiding deformations of the product.

According to some embodiments, the step g of sintering is preceded by a step of applying an antioxidant on the surface of the product.

Figure 2:
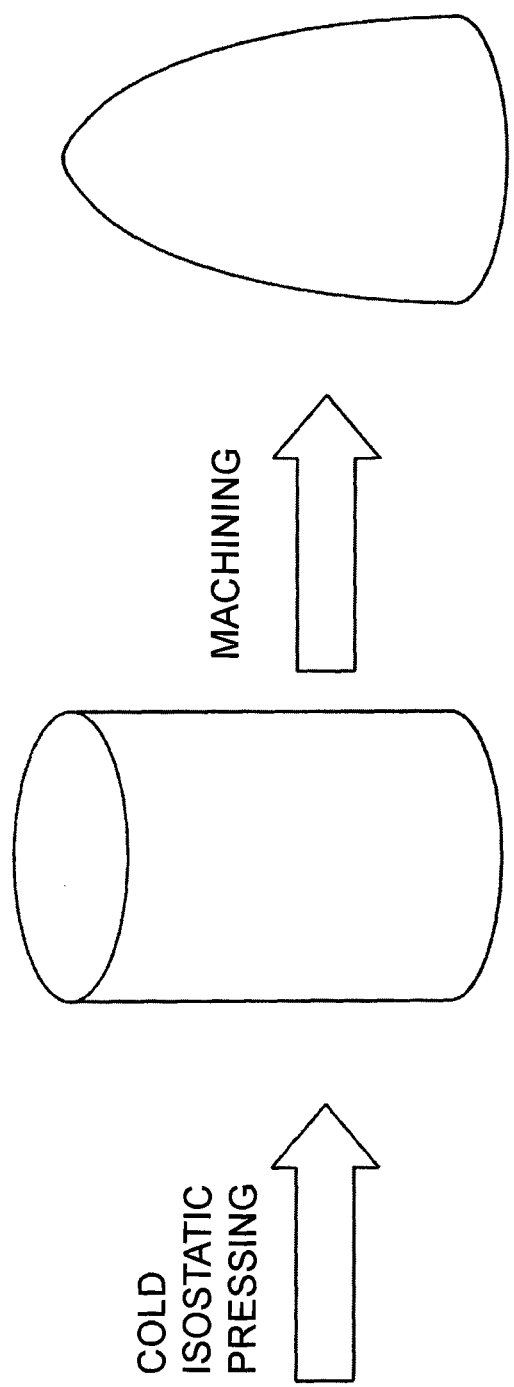

For a better understanding of the invention and in order to observe the advantages thereof, following is a description of some exemplifying and non-limiting embodiments of the ceramic material for radome and the process for producing a radome of the invention, with reference to the attached figures, wherein:

FIG. 1 schematically shows the steps of the process for producing a radome according to the present invention; and FIG. 2 shows an example of an article made using the material of the invention, during some specific production steps.

The ceramic material for radome according to the present invention is a material based on silicon nitride, it actually comprises about 80-95% (% wt) of $Si_3N_4$.

Preferably about 15-35% (wt %) of $Si_3N_4$ is $\beta$-$Si_3N_4$. It was actually discovered that a specific controlled percentage of such phase allows obtaining a low dielectric constant and thus improving the dielectric capacities of the material, i.e. its capacities to be transparent to the electromagnetic waves.

In particular, the material of the invention is optimal for radome, i.e. for structures adapted to protect antennae, thus the expression "good dielectric properties" is used to indicate the capacity of the material to be transparent to the energy emitted and received by an antenna.

The material of the invention further comprises about 5-15% (wt %) of magnesium aluminosilicates including 2.5-12.5% (wt %) of $SiO_2$, 0.5-3% (wt %) of MgO and 2-6% (wt %) of $Al_2O_3$.

Preferably the material comprises 90-94% (wt %) of $Si_3N_4$; and 6-10% (wt %) of magnesium aluminosilicates including 3.2-5% (wt %) of $SiO_2$, 0.7-2% (wt %) of MgO and 2.1-4% (wt %) of $Al_2O_3$.

A particularly preferred composition of the material according to the present invention comprises 90% (wt %) of $Si_3N_4$, 5.1% (wt %) of $SiO_2$, 1.4% (wt %) of MgO and 3.5% (wt %) of $Al_2O_3$.

Particularly desired results were obtained using such composition.

According to the present invention, the ceramic material has a density not lower than 2.5 g/cm$^3$ and preferably comprised between 2.5 and 2.9 g/cm$^3$.

Such characteristic, together with the composition, is fundamental for defining the mechanical resistance properties of the material and thus for obtaining a product suitable for aerospace applications.

Furthermore, the dielectric constant of the material does not exceed 6.5, in particular comprised between 5.7 and 6.4, at ambient temperature and at high temperatures in the X, Ku and Ka bands.

According to a further aspect, the invention relates to an article comprising such material and, in particular, a radome comprising such material. Preferably it is a radome for missile applications and, generally aerospace applications, but it could also be applied in different contexts, for example in nautical applications.

Following is a description of a process for producing a radome according to the present invention.

The process of the invention provides a first step a of forming a homogeneous mixture of about 80-950 (% wt) of $Si_3N_4$ powder and about 5-15% (wt %) of magnesium aluminosilicates powder including 2.5-12.5% (wt %) of $SiO_2$, 0.5-3% (wt %) of MgO and 2-6% (wt %) of $Al_2O_3$.

Preferably the material comprises 90-94% (wt %) of $Si_3N_4$; and 6-10% (wt %) of magnesium aluminosilicates including 3.2-5% (wt %) of $SiO_2$, 0.7-2% (wt %) of MgO and 2.1-4% (wt %) of $Al_2O_3$.

A particularly preferred composition of the material according to the present invention comprises 90% (wt %) of $Si_3N_4$, 5.1% (wt %) of $SiO_2$, 1.4% (wt %) of MgO and 3.5% (wt %) of $Al_2O_3$.

Such step may be carried out by mixing all the components together or through two subsequent sub-steps, i.e. a first sub-step a' which provides for the homogeneous mixing of $Si_3N_4$ with $SiO_2$ so as to form a pre-mixture; and then a second sub-face a" which provides for mixing the pre-mixture with MgO and with $Al_2O_3$.

In both cases, the mixing preferably occurs with addition of water, in that it aids the subsequent atomization step. Alternatively, ethanol or any other solvent of the known type could be used.

The mixing is such to guarantee homogeneity and intimate contact between the powders.

Such step is preferably carried out in special mills or roller mixers.

There follows a step b of adding at least one organic binder to the mixture.

Such binder is of the known type and it may for example be polyethylene glycol.

It is adapted to aid the mixing facilitating an intimate bond between the powder particles.

Subsequently the mixture is atomised in a known manner, preferably by means of an atomiser provided with a cyclone, according to a step c.

At the end of such step, the mixture is in a homogeneous and stable amorphous dispersion form.

Subsequently the mixture is subjected to isostatic pressing at ambient temperature in a special mould (step d). Such pressing is carried out at a pressure comprised between 1500 and 1800 bars.

The mould has a shape compatible to the shape of the product intended to be obtained and is preferably of the elastomeric type.

In the specific application it is cylindrically-shaped and it is provided with a cylindrical core concentric thereto so as to confer the hollow cylindrical shape to the mixture, as shown in FIG. 2.

After having introduced the mixture into the cylinder, the core is introduced, then the mould is sealed and the mixture is subjected to isostatic pressure.

The obtained product is a green semi-finished product.

At this point a step e is carried out of mechanical machining the green semi-finished product so as to confer the semi-finished product the desired shape, which substantially coincides with the final shape of the product, shown in FIG. 2.

As previously mentioned, such step—being carried out on a green semi-finished product, and thus on a more malleable product—allows obtaining considerable advantages in terms of process and features of the finished product.

Thus, at the end of the mechanical machining, the semi-finished product, though green, substantially has its final shape.

According to a preferred embodiment, such shape is conoidal or ogive-shaped.

Subsequently a step f is carried out of subjecting the shaped green semi-finished product to a thermal cycle adapted to eliminate the organic binder.

It is to be optimised according to the specific composition used and the dimensions of the semi-finished product and it is preferably actuated in atmosphere.

According to preferred embodiments, the thermal cycle comprises the sub-steps of gradually raising the temperature, in particular the temperature is raised of 8° C./h up to reaching a temperature of 300° C.-390° C. (step f'), and leaving the semi-finished product at the reached temperature for 3-6 hours (step f").

Preferably the step f is carried out in a furnace which provides a specific support or base and/or a system for conveying gases such to guarantee the organic binder to exit from the piece gradually and uniformly.

In other words, the organic binder evaporated from the material may remain trapped within the cavity of the article causing deformations or breakage.

In order to prevent this, the furnace is provided with a grid or a base provided with openings so as to allow the passage of such binder therethrough.

Alternatively or additionally, the furnace may be provided with a suitable support which allows positioning the piece with the opening, and thus the concavity, facing upwards.

Alternatively or additionally, further systems for conveying gases may be provided which force the motion gases into the desired direction.

According to preferred embodiments of the process of the invention, follows a step h of applying an anti-oxidant on the surface of the finished product.

Such application is preferably made by spraying.

The green semi-finished product is then subjected to the step g of sintering so as to obtain the finished product.

Such step is preferably carried out at a temperature of 1500° C.-1650° C. and/or with liquid phase in inert atmosphere, preferably in nitrogen.

The sintering thermal cycle is optimised so as to obtain a specific microstructure.

It was observed that the sintering kinetic is strongly affected by the specific initial composition of the material, in addition to the temperature.

Preferably, the step g of sintering is carried out on a support made of the same material as the semi-finished product.

EXAMPLE

90% (wt %) of $Si_3N_4$, 5.1% (wt %) of $SiO_2$, 1.4% (wt %) of MgO and 3.5% (wt %) of $Al_2O_3$ were mixed in a blade mill together with water and polyethylene glycol so as to obtain a slurry.

The mixture was atomised and then subjected to isostatic pressing at ambient temperature in a cylindrical mould at a pressure of 1500 bar.

The semi-finished product thus obtained was machined externally by means of numerical control machining, so as to confer it an ogive shape.

Subsequently, it was subjected to the following thermal cycle:

raising the temperature of 8° C./h up to reaching a temperature of 300° C.-390° C.;

maintaining in temperature for 3-6 hours.

The product was sintered at temperature up to 1550° C. for a time of about two hours so as to obtain a finished product.

The finished product was subjected to standard verification tests attaining the following results:

| | | |
|---|---|---|
| Young's Modulus | GPa | 220 |
| Poisson's Coefficient - $\upsilon$ | | 0.26 |
| Dielectric constant - $\epsilon$ | | 6 |
| Resistance to bending (@ 21° C.) | MPa | 349 |
| Fracture toughness | $MPa \cdot m^{1/2}$ | 3.69 |
| Coefficient of thermal dilation $\lambda$ (@ 25 ÷ 1300° C.) | $10^{-6} K^{-1}$ | 3.42 |
| Density | $g/cm^3$ | 2.7 |

Wherein, for Young's Modulus and Poisson's Coefficient, the measures were carried out through the method of bending resonance frequency on test pieces measuring 80×10×8 mm according to guidelines of the EN 843-2 standard.

The measurement of the Resistance to Bending was carried out according to the guidelines of the EN 843-1 standard bending in 4 points on bars with bevelled edges (measuring 25×2.5×2 mm) using a Zwick Z050 universal machine with a 0.5 mm/min speed of the beam, a distance of 10 mm for the upper blades and 20 mm for the lower ones. The test was carried out on 5 test pieces.

The measurement of the Fracture toughness was carried out using the Chevron Notched beam method in bending according to the guidelines of the FprEN 14425-3 standard. The bending test was carried out using a Zwick 2050 universal machine, with a 0.02 mm/min speed of the beam. The test was carried out on three test pieces (measuring 25×2.5×2 mm) previously notched using a blade having a 0.1 mm thickness.

Regarding the coefficient of thermal dilation, the thermal dilation tests were carried out using a Netsch DIL E 402 dilatometer on a 25×2.5×2 mm test piece up to 1450° C. in an argon flow with 5° C./min heating speed.

The measurements of dielectric constant were carried out with a waveguide method filled with dielectric.

The density measurements were carried out on sintered samples, geometrically, using Archimede's method according to the ASTM C373 standard.

CONCLUSIONS

The obtained results show that the particular composition used and the combination of the specific steps of the process allow obtaining a material with good mechanical characteristics, good heat resistance and good dielectric characteristics.

In the description above and in the subsequent claims, all the numerical quantities indicating amounts, parameters, percentages, and so on shall be deemed preceded under any circumstances by the term "about" unless indicated otherwise. Furthermore, all numerical quantity ranges include all possible combinations of the maximum and minimum numerical values and all possible intermediate ranges, besides those specifically indicated in the text.

The ceramic material, radome and production process according to the present invention shall be subjected—by a man skilled in the art with the aim of meeting contingent and specific needs—to further modifications and variants, all falling within the scope of protection of the present invention.

The invention claimed is:

1. Ceramic material for radome comprising:
    about 90-94% (% wt) of $Si_3N_4$; and
    about 6-10% (wt %) of magnesium aluminosilicates including 3.2-5.2% (wt %) of $SiO_2$, 0.7-2% (wt %) of MgO and 2.1-4% (wt %) of $Al_2O_3$;
    and having a density not lower than 2.5 g/cm$^3$ and a dielectric constant not exceeding 6.5.

2. Ceramic material according to claim 1, wherein said density is comprised between 2.5 and 2.9 g/cm$^3$ and/or said dielectric constant is comprised between 5.7 and 6.4.

3. Ceramic material according to claim 1, wherein 15-35% (wt %) of $Si_3N_4$ is $\beta$-$Si_3N_4$.

4. Ceramic material according claim 1, comprising 90% (wt %) of $Si_3N_4$, 5.1% (wt %) of $SiO_2$, 1.4% (wt %) of MgO and 3.5% (wt %) of $Al_2O_3$.

5. Radome comprising a ceramic material according to claim 1.

* * * * *